United States Patent [19]

Toth

[11] 4,000,001

[45] Dec. 28, 1976

[54] HYDRODYNAMIC PRECIPITATION METHOD AND APPARATUS

[75] Inventor: Laszlo Toth, Denver, Colo.

[73] Assignee: The Great Western Sugar Company, Denver, Colo.

[22] Filed: June 23, 1975

[21] Appl. No.: 589,465

[52] U.S. Cl. .................................. 127/11; 23/283; 127/9; 127/48; 127/57; 259/4 R; 259/18; 260/701; 260/704

[51] Int. Cl.[2] .................. B01D 21/00; B01F 13/00; C13D 3/02

[58] Field of Search .............. 127/11, 22, 9, 48, 50, 127/57; 23/283, 284, 285; 259/4 R, 18; 260/701, 704

[56] References Cited

UNITED STATES PATENTS

| | | | |
|---|---|---|---|
| 2,520,957 | 9/1950 | Peterson | 127/11 |
| 3,132,156 | 5/1964 | Lemon et al. | 23/284 UX |
| 3,227,701 | 1/1966 | Pennington | 23/285 X |
| 3,495,952 | 2/1970 | Ulbrecht et al. | 23/285 |
| 3,547,409 | 12/1974 | Jacuzzi | 259/4 R |
| 3,799,195 | 3/1974 | Hermans | 259/4 R X |
| 3,837,914 | 9/1974 | Cadeo et al. | 127/22 |
| 3,885,587 | 5/1975 | Troope | 259/4 R X |
| 3,901,724 | 8/1975 | White | 127/22 |

*Primary Examiner*—Morris O. Wolk
*Assistant Examiner*—Michael S. Marcus
*Attorney, Agent, or Firm*—Bruce G. Klaas; Dennis K. Shelton

[57] ABSTRACT

A method of continuous precipitation of insoluble solids formed by the reaction of a liquid solution and a reactant by hydrodynamic agitation of the solution and the reactant in a continuous hydrodynamic precipitation apparatus. The apparatus comprises vertically standing elongated tank means; liquid level control means for maintaining tank liquid at a predetermined level in the tank means; hydrodynamic agitator means in the tank means for receiving and agitating the solution, the reactant and recirculated tank liquid; conduit means for supplying predetermined quantities of solution and reactant to the agitator means; pressure pump means for recirculating at least a portion of the liquid under pressure from the bottom portion of the tank means to the hydrodynamic agitator means; whereby the solution, the reactant and the recirculated tank liquid are thoroughly mixed by the hydrodynamic agitator means; and means for removing at least a portion of the precipitated solids from the bottom portion of the tank means.

9 Claims, 2 Drawing Figures

Fig_1

HYDRODYNAMIC PRECIPITATION METHOD AND APPARATUS

BACKGROUND OF THE INVENTION

1. Field of the Invention

This invention relates to a process and apparatus for precipitating insoluble solids from a liquid solution and a reactant which react to form the solids and, more particularly to a process and apparatus for precipitating insoluble saccharate from an aqueous sucrose solution.

2. Prior Art

Precipitation of insoluble solids from a liquid solution by the addition of a reactant is commonly facilitated by means of mechanical agitation of the solution and the reactant. For example, in the sugar industry, the formation of insoluble saccharates is commonly accomplished by such a process.

In the common commercial processes of recovering sugar from sugar beets or the like, the beets are cut into thin slices ("cossettes"), the cossettes are extracted with hot water to produce a sucrose-containing diffusion juice, and then the diffusion juice is processed to produce crystalline sugar and a molasses solution. Additional crystalline sugar may be recovered from the molasses solution by the "Steffen Process" which comprises the steps of: (1) diluting the molasses solution with water to produce a solution containing about 6% sucrose, (2) adding finely powdered quicklime (CaO) to the solution with violent agitation to precipitate insoluble saccharate, (3) filtering the solution (about 90% of the sugar is recovered in the precipitate with about 10% portion remaining in the filtrate), (4) heating the filtrate to about 90° C to form additional precipitate (contains about 6.5% of the sugar originally present in the molasses solution, and (5) recovering the additional precipitate by settling and filtration. The precipitated saccharate may then be slurried in water and reprocessed for recovery of additional crystalline sugar.

In the prior art, various methods and apparatus have been used to facilitate the addition of quicklime to the molasses solution to ensure a uniform reaction by thorough mixing of the quicklime and the molasses solution by mechanical agitation. The prior art processes have also utilized mechanical cooling in the reaction chamber to dissipate the heat of dissolution of the quicklime in the solution and the heat of reaction of the CaO with the sucrose, to obtain precipitation of the saccharate. The prior art processes have further required a very dilute molasses solution (e.g., a maximum sucrose concentration of about (6%) for efficient processing.

SUMMARY OF THE INVENTION

A method and apparatus are provided for the continuous precipitation of insoluble solids from a liquid solution and a reactant by hydrodynamically agitating the solution and the reactant. Hydrodynamic agitation results in quick, complete and intimate contact of the solution and the reactant, thereby facilitating the precipitation process.

DESCRIPTION OF THE PREFERRED EMBODIMENT

Figure 1:
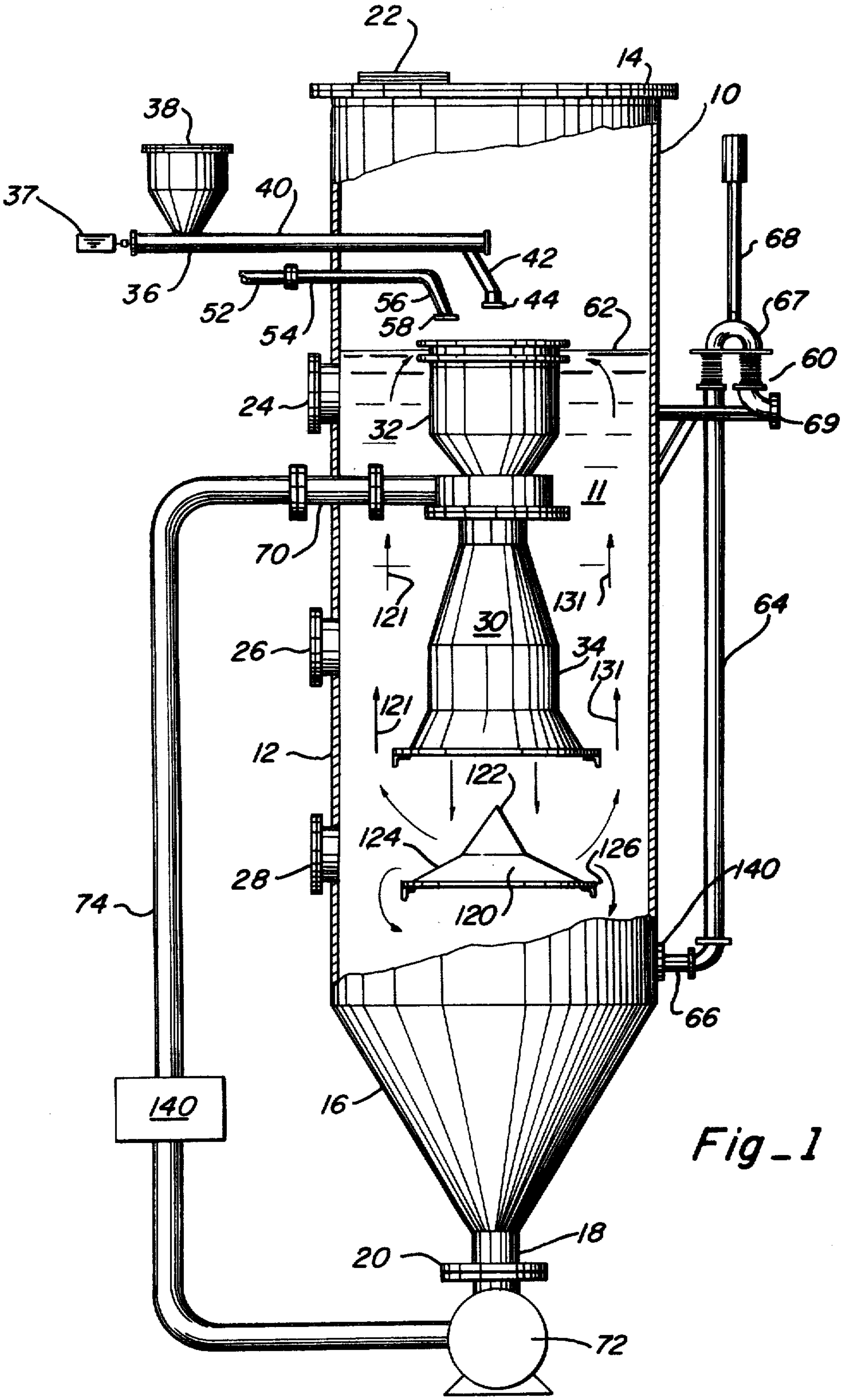
Figure 2:
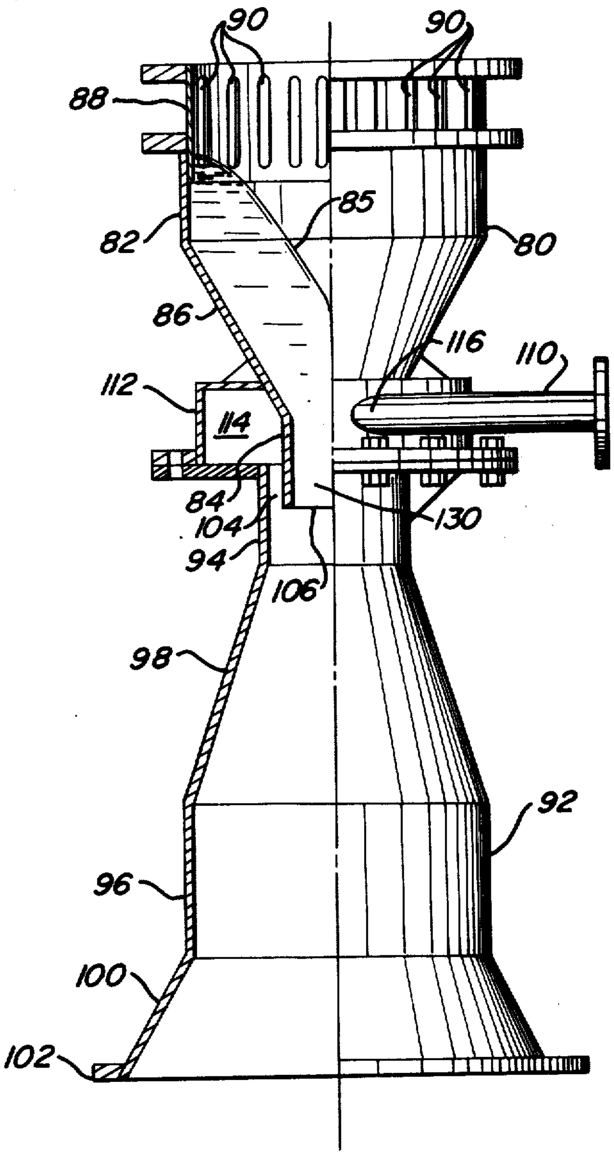

Referring to the accompanying drawing of a presently preferred and illustrative embodiment of the inventive concepts, FIG. 1 is a schematic side elevational view, partly in section, of a vertically standing precipitator tank and associated apparatus; and FIG. 2 is an enlarged side elevational view, partly in section, of a hydrodynamic agitator portion of the precipitator tank of FIG. 1.

Referring now to FIG. 1, a vertically standing precipitation tank 10 providing a process chamber 11 is shown to comprise an elongated cylindrical wall portion 12 having a cover plate 14 on the upper end and a downwardly inwardly converging conical wall portion 16 at the bottom end terminating in a reduced diameter cylindrical outlet portion 18 having a connecting flange 20. Various access openings and cover plates 22, 24, 26, 28 may be provided.

A hydrodynamic agitator assembly 30 is centrally coaxially mounted in tank 10 by suitable support means (not shown) with an upwardly opening upper end portion 32 located in an intermediate top portion of chamber 11 and a downwardly opening lower end portion 34 located in an intermediate bottom portion of chamber 11.

Conduit means 36 for supplying a reactant to the tank are located at the top portion of the tank and comprise a hopper 38, a supply conduit portion 40 extending through wall portion 12, and a discharge conduit portion 42 having a downwardly facing discharge opening 44 generally coaxial with agitator assembly 30 and located in upwardly spaced relationship to the upper end portion 32 thereof. Conduit means 36 may also comprise regulating means 37 for regulating the rate at which the reactant is supplied to the tank and may be an auger driven by a variable speed motor in the case where the reactant is in the form of a powdered solid.

Conduit means for supplying a liquid solution to the tank are located at the top of the tank and comprise a supply source 52 for supplying a regulated amount of the solution to the supply conduit 54, a supply conduit portion 54 extending through wall portion 12, and a discharge conduit portion 56 having a downwardly facing discharge opening 58 located in upwardly spaced relationship above the upper end portion 32 of the agitator assembly.

Conventional liquid level regulator means 60 are provided to maintain the level of liquid in process chamber 11 at 62 at the upper portion 32 of the agitator assembly and to maintain an atmospheric chamber in the process chamber above the liquid level which comprise a vertical conduit 64 connected to the bottom portion of the tank 10 through wall portion 12 at 66, a reverse bend conduit 67, a stand-pipe conduit 68, and a discharge conduit 69.

Pressurized circulation means for recirculation of at least a portion of the liquid in process chamber 11 comprise an inlet conduit means 70 extending through wall portion 12 for connection to an intermediate portion of the agitator assembly, a conventional recirculation pump means 72 suitably connected to the outlet portion 18 at the bottom of the tank, and conventional conduit means 74 connecting the pump means 72 to the inlet conduit means 70. Cooling means 140 are also provided for cooling the pressurized recirculation liquid prior to passage of the liquid into the agitator assembly.

Liquid deflector assembly means 120 may be provided in a downwardly spaced relationship beneath the agitator tank assembly to create a desired liquid flow pattern in process chamber 11. The deflector assembly means comprises a first upwardly facing conical wall portion 122 of minimum included angle, a second upwardly facing conical wall portion 124 of maximum included angle, and a lower radially extending flange portion 126 coaxially mounted relative to the agitator assembly.

Referring now to FIG. 2, the agitator assembly comprises an upper inlet tank means 80 having an upper cylindrical wall portion 82 of relatively large diameter connected to a lower cylindrical wall portion 84 of relatively small diameter by an intermediate downwardly inwardly converging conical wall portion 86. The relatively small diameter cylindrical wall portion 84 provides a relatively narrow first venturi-type liquid passage 130 between upper inlet tank means 80 and lower outlet tank means 92. An inlet opening screen may be provided by a ring member 88 suitably mounted on the top of tank means 80 with a plurality of circumferentially spaced vertically extending inlet slots 90 enabling flow of tank liquid from process chamber 11 into the upper portion of inlet tank means 80. The inlet slots are preferably provided with deflection means (not shown) to provide for tangential flow of the tank liquid thereby creating a vortex as the liquid flows into and through the inlet tank means.

The agitator assembly further comprises a lower outlet tank means 92 having an upper relatively small diameter cylindrical wall portion 94, a lower relatively large diameter cylindrical wall portion 96, a first intermediate downwardly outwardly diverging conical wall portion 98 connecting wall portions 94 and 96, and a second lower downwardly outwardly diverging conical wall portion 100 terminating in a radially extending flange portion 102. The inside diameter of wall portion 94 is larger than the outside diameter of wall portion 84 so as to provide an annular relatively narrow width second venturi-type liquid passage 104 therebetween with the bottom surface 106 of wall portion 84 terminating with the wall portion 94 somewhat more than one-half the distance from the lower end to the upper end of wall portion 94. The inside diameter of wall portion 96 is approximately the same as the inside diameter of wall portion 82.

Although the method and apparatus of the invention is deemed to have general applicability, it has been found to be particularly advantageous in the precipitation of saccharate from an aqueous sucrose-containing molasses solution by reacting the solution with quicklime (finely powdered CaO). It is in this context that the method of operation of the apparatus previously discussed is described.

In normal operation, the chamber 11 of tank 10 contains a mixture of an aqueous molasses solution, quicklime and precipitated solids (collectively termed "tank liquid") with a liquid level maintained at 62 by liquid level regulating means 60 so that the top portion of the tank liquid is constantly flowing into inlet tank 80 through inlet slots 90. A uniform flow of tank liquid forming a vortex in the inlet tank, having an upper surface configuration generally illustrated at 85 in FIG. 2, is thereby obtained with the flow being directed generally radially inwardly into the central portion of chamber 130 provided by wall portion 84 to provide a central area of high activity of tank liquid interaction. In addition, regulated amounts of aqueous molasses solution and quicklime are continuously added to tank 80 through inlet conduits 42, 56 and discharge openings 44, 58 and are mixed with the tank liquid flowing through tank 80. Since the diameter of wall portion 84 is substantially smaller than the diameters of wall portions 82, 94 and 98, a pressure differential is created between inlet tank means 80 and outlet tank means 92 whereby a first venturi-type effect is obtained.

At the same time that the molasses solution, the quicklime and tank liquid flow through tank 80 as previously described, tank liquid is continuously added through manifold 110 under pressure of recirculation pump means 72. The relatively high pressure liquid in chamber 114 rapidly flows through the second venturi throat area provided by passage 104 into the area provided within wall portion 94 below wall portion 84 and then downwardly into the expansion area provided by conical wall portion 98 providing an area of relatively low hydrostatic pressure below passage 104. The mixture of tank liquid, incoming molasses solution, and additional quicklime are thereby drawn through the first venturi throat at relatively high velocity and immediately enter a zone of extremely high turbulence below the second venturi throat area and are very quickly and uniformly mixed and intimately contacted with the recirculated tank liquid entering the second venturi throat area from passage 104. A conical reaction chamber is provided by the conical wall portion 98 wherein the quicklime substantially completely reacts with the aqueous molasses solution, the tank liquid and the pressurized recirculation liquid to form insoluble solids comprising saccharate as the liquid flow expands downwardly through chambers of increasing area provided by wall portions 96, 98, 100. In the presently preferred embodiment, the ratio of volume of pressurized recirculation liquid from pump 72 to the volume of molasses solution, added at the top of tank 80 is between 5:1 and 10:1. The highly efficient interaction of the quicklime, the molasses solution and the tank liquid obtained by the invention permits the processing of more highly concentrated sucrose solutions than is possible with prior art systems. For example, the incoming molasses solution may contain up to about 10% by weight sucrose.

In the continuous precipitation process, a first portion of tank liquid flowing from lower outlet tank 92 internally recirulates upwardly as indicated by arrows 121, 131 to re-enter the upper inlet tank 80 while a second portion of the tank liquid flows downwardly to the recirculation pump 72 for pressurized re-entry into manifold chamber 114. During the process, a portion of the processed tank liquid, including the insoluble solids comprising saccharate, is drawn off through a discharge opening 140 for further processing in a conventional manner so as to maintain a constant liquid level in process chamber 11 as additional molasses solution and quicklime are added. Precipitated particles of insoluble saccharate settling toward the bottom of the tank are drawn off through the discharge opening along with the processed tank liquid or may additionally be drawn off from time to time through another suitable discharge opening (not shown) located toward the bottom of wall portion 12 or conical wall portion 16.

While inventive concepts have been disclosed hereinbefore in relating to a presently preferred and illustrative embodiment of the invention, it is contemplated that the inventive concepts may be variously otherwise employed and embodied in alternative structure. For example, although the above description contemplates continuous hydrodynamic precipitation, such precipitation may be carried out on a batchwise basis. In addition, although the inventive concepts provide particular advantageous results in the processing of sugar beet molasses, the inventive concepts may be applicable to other types of processes. Thus, it is intended that the appended claims be construed to cover alternative embodiments of the inventive concepts except insofar as excluded by the prior art.

What is claimed is:

1. Apparatus for processing a liquid solution to obtain and remove insoluble solids formed by reacting the solution with a reactant comprising:

vertically standing elongated process tank means providing a process chamber for holding a tank liquid comprising a mixture of a liquid solution, a reactant and insoluble solids, said tank means having upper, intermediate and lower portions;

liquid level control means connected to said tank means and communicating with said process chamber for maintaining a predetermined upper liquid level in an intermediate portion of said tank means spaced below the upper portion of said tank means to provide an atmospheric chamber above said liquid level;

agitator means for mixing regulated quantities of the liquid solution, the reactant and the tank liquid, said agitator means being centrally mounted in said intermediate portion of said tank means in substantially immersed relationship to the tank liquid below the upper level of the tank liquid;

said agitator means comprising upper inlet means having an upwardly facing opening at the top of said upper inlet means which communicates with said atmospheric chamber and process tank liquid inlet means on the periphery of said upper inlet means adjacent said upwardly facing opening for permitting flow of tank liquid from said process chamber into said upper inlet means;

conduit means for supplying regulated quantities of the liquid solution to said agitator means and for supplying predetermined quantities of the reactant to said agitator means and extending into the upper portion of said process tank means and having a discharge opening located in said atmospheric chamber above the upwardly facing opening of said upper inlet means to discharge the liquid solution and the reactant therein;

said agitator means further comprising a first passage means for receiving the liquid solution, the reactant and the tank liquid from said upper inlet means and connected thereto to receive tank liquid from said process chamber and the liquid solution and the reactant from said conduit means and being of reduced cross-sectional area relative to the cross-sectional area of said upper inlet means to provide a first venturi-throat area, said first passage means terminating in a downwardly facing discharge opening;

said agitator means further comprising a lower outlet means located below said first venturi-throat area and connected to said upper inlet means thereby, said lower outlet means having a second passage means of larger cross-sectional area than said first venturi-throat area and extending upwardly thereabout and therebeyond and terminating upwardly in an upwardly facing inlet opening spaced upwardly of said downwardly facing discharge opening to provide a second venturi-throat area extending about said first venturi-throat area;

inlet manifold means for receiving pressurized, recirculated tank liquid and being mounted above said second passage means and being of larger cross-sectional area than said second passage means and connected to said second passage means by said upwardly facing inlet opening, said inlet manifold means being disassociated from said upper inlet means and said process chamber and said first passage means;

a lower downwardly facing discharge opening at the lower end of said lower outlet means connecting said lower outlet means to said process chamber in the lower portion of said process tank means;

pressure pump means for recirculating a regulated portion of the tank liquid from the bottom portion of said process chamber to said inlet manifold means under regulated pressure;

said lower outlet means receiving the pressurized portion of the tank liquid through said second passage means while simultaneously receiving the regulated amounts of liquid solution, reactant, and tank liquid through said first passage means;

said first venturi-throat area causing said tank liquid from the upper portion of the process chamber and said liquid solution and said reactant to flow into said lower outlet means, and said second venturi-throat area causing said pressurized tank liquid from the bottom portion of the process tank to be discharged into said lower outlet means at relatively high velocity whereby to draw said tank liquid and said liquid solution and said reactant into said lower outlet means and to create a zone of relative high turbulence in said lower outlet means enhancing said process.

2. The apparatus of claim 1 which further comprises liquid deflector means in the process chamber coaxially mounted beneath said discharge opening of said lower outlet means for creating a liquid flow path upwardly around said agitator means to said liquid inlet means.

3. Apparatus for processing an aqueous sucrose solution to obtain and remove insoluble solids formed by reacting the solution with CaO comprising:

vertically standing elongated process tank means providing a process chamber for holding a tank liquid comprising a mixture of an aqueous sucrose solution, CaO and insoluble solids, said tank means having upper, intermediate and lower portions;

liquid level control means connected to said process chamber for maintaining a predetermined upper liquid level in said tank means spaced below the upper portion of said tank means to provide an atmospheric chamber above said liquid level;

agitator means for mixing regulated quantities of the solution, the CaO and the tank liquid, said agitator means being centrally mounted in said intermediate portion of said tank means in substantially immersed relationship to the tank liquid below the upper level of the tank liquid;

said agitator means comprising an upper inlet means having an upwardly facing opening at the top of said upper inlet means connected to said atmospheric chamber and process tank liquid inlet means on the periphery of said upper inlet means adjacent said upwardly facing opening for permitting flow of tank liquid from said process chamber into said upper inlet means;

first conduit means for supplying regulated quantities of the solution to said agitator means and extending into the upper portion of said process tank means and having a discharge opening located in said atmospheric chamber above the upwardly facing opening of said upper inlet means to discharge the solution therein;

second second conduit means for supplying predetermined quantities of the CaO to said agitator means and extending into the upper portion of said process tank means and having a discharge opening located in said atmospheric chamber above the upwardly facing opening of said upper inlet means to discharge the CaO therein;

said agitator means further comprising a first passage means for receiving the solution, the CaO and the tank liquid from said upper inlet means and connected thereto receive tank liquid from said process chamber and the solution from said first conduit means and the CaO from said second conduit means and being of reduced cross-sectional area relative to the cross-sectional area of said upper inlet means to provide a first venturi-throat area, said first passage means terminating in a downwardly facing discharge opening;

said agitator means further comprising a lower outlet means located below said first venturi-throat area and connected to said upper inlet means thereby, said lower outlet means having a second passage means of larger cross-sectional area than said first venturi-throat area and extending upwardly thereabout and therebeyond and terminating upwardly in an upwardly facing inlet opening spaced upwardly of said downwardly facing discharge opening to provide a second venturi-throat area extending about said first venturi-throat area, inlet manifold means for receiving pressurized, recirculated tank liquid and being mounted above said second passage means and being of larger cross-sectional area than said second passage means and connected to said second passage means by said upwardly facing inlet opening, said inlet manifold means being disassociated from said upper inlet means and said process chamber and said first passage means;

a lower downwardly facing discharge opening at the lower end of said lower outlet means connecting said lower outlet means to said process chamber in the lower portion of said process tank means;

pressure pump means for recirculating a regulated portion of the tank liquid from the bottom portion of said process chamber to said inlet manifold means under regulated pressure;

said lower outlet means receiving the pressurized portion of the tank liquid through said second passage means while simultaneously receiving the regulated amounts of solution, CaO, and tank liquid through said first passage means;

said first venturi-throat area causing said tank liquid from the upper portion of the process chamber and said solution and said CaO to flow into said lower outlet means, and said second venturi-throat area causing said pressurized tank liquid from the bottom portion of the process tank to be discharged into said lower outlet means at relatively high velocity whereby to draw said tank liquid and said solution and said CaO into said lower outlet means and to create a zone of relative high turbulence in said lower outlet means enhancing said process.

4. The apparatus of claim 3 which further comprises liquid deflector means in the process chamber coaxially mounted beneath said discharge opening of said lower outlet means for creating a liquid flow path upwardly around said agitator means to said liquid inlet means.

5. The process of reacting a liquid solution and tank liquid with a reactant to form insoluble solids comprising:

supplying regulated quantities of a liquid solution, a first portion of tank liquid and a reactant to an inlet means in a process chamber having a constricted passage portion forming a first venturi throat within said inlet means;

causing the solution, the first portion of tank liquid and the reactant to flow through said first venturi throat into an outlet means;

mixing the solution, the first portion of tank liquid and the reactant by recirculating a regulated second portion of tank liquid under pressure to a second venturi throat about said first venturi throat and in fluid communication with said outlet means so as to cause the liquid solution, the first portion of tank liquid and the reactant to flow through said first venturi throat into said outlet means at high velocity and to cause a high level of turbulence between the solution, the first and second portions of tank liquid and the reactant as the solution, the first and second portions of tank liquid and the reactant enter the outlet means and allowing the solution, the first and second portions of tank liquid and the reactant to react in the outlet means thereby forming the insoluble solids.

6. The process of claim 5 wherein the solution, the first portion of tank liquid and the reactant are continuously supplied to the inlet means and which further comprises removing at least a portion of the insoluble solids and the tank liquid from the process chamber so as to maintain a constant liquid level in the process chamber.

7. The process of reacting an aqueous sucrose solution and tank liquid with CaO to form insoluble solids comprising:

supplying a regulated quantity of an aqueous sucrose solution, a first portion of tank liquid and CaO to an inlet means in a process chamber having a constricted passage portion forming a first venturi throat within said inlet means;

causing the solution, the first portion of tank liquid and the Cao to flow through said first venturi throat into an outlet means;

mixing the aqueous sucrose solution, the first portion of tank liquid and the CaO by recirculating a regulated second portion of the tank liquid under pressure to a second venturi throat area about said first venturi throat and in fluid communication with said outlet means so as to cause the aqueous sucrose solution, the first portion of tank liquid and the CaO to flow through said first venturi throat into said outlet means at high velocity and to cause a high level of turbulence between the solution, the first and second portions of tank liquid and the CaO as the solution, the first and second portions of tank liquid and the CaO enter the outlet means, and allowing the solution, the first and second portions of tank liquid and the CaO to react in the outlet means thereby forming the insoluble solids.

8. The process of claim 7 wherein the aqueous sucrose solution, the first portion of tank liquid and the CaO are continuously supplied to the inlet means and which further comprises removing at least a portion of the insoluble solids and the tank liquid from the process chamber so as to maintain a constant liquid level in the process chamber.

9. The process of claim 7 wherein the regulated second portion of pressurized tank liquid is about 5 to about 10 times by volume of the regulated quantity of solution supplied to the inlet means.

* * * * *

UNITED STATES PATENT OFFICE

CERTIFICATE OF CORRECTION

PATENT NO. : 4,000,001

DATED : December 28, 1976

INVENTOR(S) : Laszlo Toth

It is certified that error appears in the above-identified patent and that said Letters Patent are hereby corrected as shown below:

Column 1, line 53, "(6%)" should read --6%)--. Column 3, line 40, "with the" should read --within the--. Claim 3, column 7, line 8, cancel "second", second occurrence. Claim 7, line 10, "Cao" should read --CaO--.

Signed and Sealed this

Eighth Day of March 1977

[SEAL]

*Attest:*

RUTH C. MASON
*Attesting Officer*

C. MARSHALL DANN
*Commissioner of Patents and Trademarks*